United States Patent

Harada et al.

[11] 4,195,037
[45] Mar. 25, 1980

[54] 4-ALKOXY-3,5-DIAMINO-α,α,α-TRIFLUOROMETHYL-BENZENE AND MANUFACTURE THEREOF AND HARDENER FOR POLYURETHANE ELASTOMER THEREOF

[75] Inventors: Takao Harada; Nobuhide Wada, both of Shizuoka; Hideaki Ohashi, Fujieda; Wataro Koike, Shizuoka; Chihiro Yazawa, Yokohama, all of Japan

[73] Assignee: Ihara Chemical Industry Co., Ltd., Tokyo, Japan

[21] Appl. No.: 948,348

[22] Filed: Oct. 4, 1978

[30] Foreign Application Priority Data

Dec. 21, 1977 [JP] Japan .................... 52-154193

[51] Int. Cl.² ............................. C07C 93/08
[52] U.S. Cl. ..................... 260/575; 528/64
[58] Field of Search .................. 260/575; 528/64

[56] References Cited

U.S. PATENT DOCUMENTS

| 2,194,925 | 3/1940 | Daudt et al. | 260/575 |
| 2,194,926 | 3/1940 | Daudt et al. | 260/575 |
| 4,005,143 | 1/1977 | Bohm et al. | 260/575 |

FOREIGN PATENT DOCUMENTS 37-1276 6/1959 Japan ........................ 260/575

OTHER PUBLICATIONS

Morrison et al., "Organic Chemistry", Third Edition, pp. 799-800, (1975).

Primary Examiner—John Doll
Attorney, Agent, or Firm—Oblon, Fisher, Spivak, McClelland & Maier

[57] ABSTRACT

4-Alkoxy-3,5-diamino-α,α,α-trifluoromethylbenzene having the formula

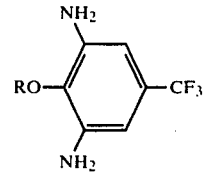

wherein R represents an alkyl group.

2 Claims, No Drawings

4-ALKOXY-3,5-DIAMINO-α,α,α-TRIFLUOROMETHYL-BENZENE AND MANUFACTURE THEREOF AND HARDENER FOR POLYURETHANE ELASTOMER THEREOF

BACKGROUND OF THE INVENTION

The present invention relates to 4-alkoxy-3,5-diamino-α,α,α-trifluoromethylbenzene and a manufacture thereof and a hardener for polyurethane elastomer thereof.

It has been known that aromatic diamines are used as hardeners for polyurethane elastomers. Various aromatic diamines have been proposed.

However, satisfactory aromatic diamines could not be obtained because of the various requirements needed in a hardener for polyurethane elastomers.

The important factors required for the hardener are as follows.

Firstly, it should be a low melting point solid or liquid from the viewpoints of processability, labour hygiene and energy saving.

Secondly, a pot life from the time of mixing hardener with a mixture of polyisocyanate and polyol or a prepolymer having the terminal isocyanate group to nonflowing the mixture for casting, should be suitable.

Thirdly, a set time of the demoldable time from molding to demolding from the viewpoint of processability especially efficiency.

Fourthly, the object hardener should be easily produced and be stable.

Fifth, the resulting polyurethane elastomer should have excellent physical properties.

However, these requirements are contradictory for example, if a short set time is required, the pot life is shortened to cause a trouble in the processing. Accordingly, it is difficult to obtain a hardener having satisfactory and balanced characteristics.

3,3'-Dichloro-4,4'-diaminodiphenylmethane is a known hardener for polyurethane elastomer having excellent physical characteristics, however, it has the disadvantage of high melting point which cause inferior processability.

4-Chloro-3,5-diamino-α,α,α-trifluoromethylbenzene has long pot life but it has long set time and a polyurethane elastomer having inferior physical characteristic is obtained, disadvantageously.

The inventors have studied on syntheses of various compounds for finding hardeners having satisfactory characteristics for polyurethane elastomers.

SUMMARY OF THE INVENTION

It is an object of the present invention to provide novel compounds of 4-alkoxy-3,5-diamino-α,α,α-trifluoromethylbenzenes.

It is another object of the present invention to provide new use for 4-alkoxy-3,5-diamino-α,α,α-trifluoromethylbenzene as hardeners for polyurethane elastomers.

It is the other object of the present invention to produce 4-alkoxy-3,5-diamino-α,α,α-trifluoromethylbenzenes.

The novel compounds of 4-alkoxy-3,5-diamino-α,α,α-trifluoromethylbenzenes have the formula

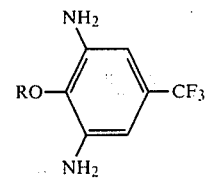

(I)

wherein R represents a $C_1$–$C_8$ alkyl group.

DETAILED DESCRIPTION OF THE PREFERRED EMBODIMENTS

The novel 4-alkoxy-3,5-diamino-α,α,α-trifluoromethylbenzenes include

Compound (1): 4-methoxy-3,5-diamino-α,α,α-trifluoromethylbenzene;

Compound (2): 4-ethoxy-3,5-diamino-α,α,α-trifluoromethylbenzene;

Compound (3): 4-n-propoxy-3,5-diamino-α,α,α-trifluoromethylbenzene;

Compound (4): 4-i-propoxy-3,5-diamino-α,α,α-trifluoromethylbenzene;

Compound (5): 4-n-butoxy-3,5-diamino-α,α,α-trifluoromethylbenzene;

Compound (6): 4-i-butoxy-3,5-diamino-α,α,α-trifluoromethylbenzene;

Compound (7): 4-t-butoxy-3,5-diamino-α,α,α-trifluoromethylbenzene;

Compound (8): 4-n-pentyloxy-3,5-diamino-α,α,α-trifluoromethylbenzene;

Compound (9): 4-n-hexyloxy-3,5-diamino-α,α,α-trifluoromethylbenzene.

These compounds have excellent satisfactory characteristics for hardeners for polyurethane elastomers.

The novel 4-alkoxy-3,5-diamino-α,α,α-trifluoromethylbenzenes can be produced by converting 4-halogeno-3,5-dinitro-α,α,α-trifluoromethylbenzene having the formula

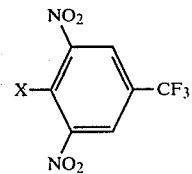

(II)

wherein X represents a halogen atom into 4-alkoxy-3,5-dinitro-α,α,α-trifluorobenzene having the formula

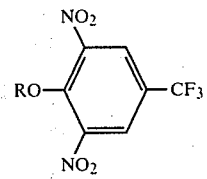

(III)

wherein R is defined above, by a dehalogenation and an alkoxylation, and then, reducing the product. The reaction formulae are as follows.

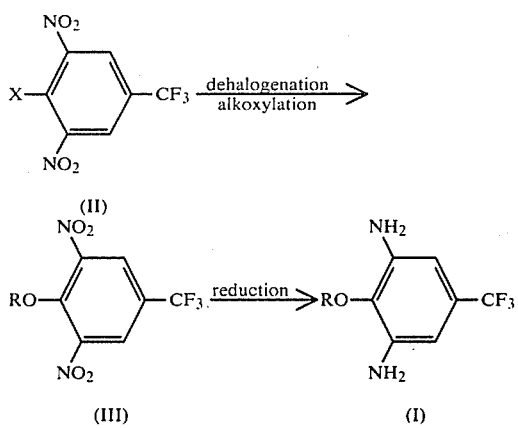

wherein X and R are defined above.

The 4-halogeno-3,5-dinitro-α,α,α-trifluoromethylbenzenes (II) starting materials used for producing the object compounds (I) include 4-chloro-3,5-dinitro-α,α,α-trifluoromethylbenzene; 4-bromo-3,5-dinitro-α,α,α-trifluoromethylbenzene.

The dehalogenation and alkoxylation of 4-halogeno-3,5-dinitro-α,α,α-trifluoromethylbenzene (II) can be preformed by reacting an alcohol having the formula

ROH    (IV)

wherein R is defined above in the presence of an alkali metal hydroxide under the atmospheric pressure or higher pressure, or by reacting an alkali metal alkoxide having the formula

ROM    (V)

wherein R is defined above and M represents an alkali metal atom in an alcohol medium.

When the dehalogenation and alkoxylation are performed by reacting the compound (IV) with an alcohol in the presence of an alkali metal hydroxide, the alkali metal hydroxide can be sodium hydroxide, potassium hydroxide etc.

The alkali metal hydroxide is preferably added in more than equimolar amounts especially slightly in excess to 4-halogeno-3,5-dinitro-α,α,α-trifluoromethylbenzene (II).

The alcohols having the formula (IV) include methanol, ethanol, n-propanol, i-propanol, n-butanol, i-butanol, t-butanol, n-pentanol, n-hexanol etc.

These alcohols can be also used as solvents for the reaction. It is preferable to use an alcohol at a ratio of 5 to 20 moles especially 8 to 15 moles per 1 mole of 4-halogeno-3,5-dinitro-α,α,α-trifluoromethylbenzene.

When the dehalogenation and alkylation are performed by reacting an alkali metal alkoxide (V) in an alcohol solvent (IV), the alkali metal alkoxide can be sodium methoxide, sodium ethoxide, sodium n-propoxide, sodium i-propoxide, sodium n-butoxide, sodium i-butoxide, sodium n-pentyloxide, sodium n-hexyloxide or the corresponding potassium alkoxides etc.

The alkali metal alkoxide is preferably added more than equimole especially slight excess to 4-halogeno-3,5-dinitro-α,α,α-trifluoromethylbenzene (II).

When the dehalogenation and alkylation are performed by reacting 4-halogeno-3,5-dinitro-α,α,α-trifluoromethylbenzene (II) with the alcohol (IV) in the presence of an alkali metal hydroxide or by reacting 4-halogeno-3,5-dinitro-α,α,α-trifluoromethylbenzene (II) with the alkali metal alkoxide (V) in an alcohol solvent, it is preferable to perform the reaction at a temperature of 30° to 160° C. preferably at a refluxing temperature of the alcohol (IV) or the solvent of the alcohol.

After the dehalogenation and alkoxylation, the reaction mixture was treated by the conventional methods such as distillation of the alcohol, water washing, distillation of the product and recrystallization whereby 4-alkoxy-3,5-dinitro-α,α,α-trifluoromethylbenzene (III) can be obtained in a yield of 80 to 95%.

In the reduction of 4-alkoxy-3,5-dinitro-α,α,α-trifluoromethylbenzene (III) as the second step of the present invention, a reduction with iron in the presence of a catalytic amount of an acid such as hydrochloric acid, sulfuric acid or acetic acid or a reduction with concentrated hydrochloric acid and tin or stannous chloride, or a reduction with hydrogen in the presence of a catalyst of platinum, nickel or palladium, can be applied.

For example, in the reduction with iron in the presence of a catalytic amount of an acid, a solution of 4-alkoxy-3,5-dinitro-α,α,α-trifluoromethylbenzene (III) in a solvent of benzene, toluene or xylene is added to a mixture of iron, an acid, water and a solvent e.g. benzene, toluene and xylene, under refluxing and then, the reaction is continued under refluxing.

After the reduction, the resulting reaction mixture is treated by the conventional method such as filtration, phase separation, distillation of the solvent, distillation of the product and recrystallization whereby the object compound of 4-alkoxy-3,5-diamino-α,α,α-trifluoromethylbenzene (I) is obtained in a yield of 80 to 95% based on 4-alkoxy-3,5-dinitro-α,α,α-trifluoromethylbenzene (III) (65 to 90% based on 4-halogeno-3,5-dinitro-α,α,α-trifluoromethylbenzene).

In the manufacture of polyurethane elastomer by using the compound (I) as the hardener, the hardener of the compound (I) in a molten condition is added to a heated reaction mixture of a polyisocyanate with a polyol or a polyurethaneprepolymer having terminal isocyanate groups or a polyisocyanate is added to a mixture of a polyol and the hardener of the compound (I) and then, the mixture is thoroughly mixed and poured into a casting mold and it is hardened.

Suitable polyisocyanates used in the manufacture, include hexamethylene diisocyanate (HMDI) cyclohexane diisocyanate, 2,4-tolylene diisocyanate (2,4-TDI), 2,6-tolylene diisocyanate (2,6-TDI), and a mixture of 2,4-TDI and 2,6-TDI, dimer and trimer of 2,4-tolylene diisocyanate, xylylene diisocyanate (XDI), meta-xylylene diisocyanate (MXDI), m-phenylene diisocyanate, 4,4'-biphenyl dissocyanate, diphenyl ether-4,4'-diioscyanate, 3,3'ditoluene-4,4'-diisocyanate (TODI), dianisidine diisocyanate (DADI), 4,4'-diphenylmethane diisocyanate (MDI), 3,3'-dimethyl-4,4'-diphenylmethane diisocyanate, 1,5-naphthalene diisocyanate (NDI) triphenylmethane triisocyanate (TTI) and others which are used for producing polyurethanes.

Suitable polyols include aliphalic polyester glycols such as polyethylene adipate polybutylene adipate and polypropylene adipate which are obtained by a condensation polymerization of an aliphatic glycol and a dicarboxylic acid; polyalkylene ether glycols such as polypropylene ether glycol and tetramethylene ether glycol which are obtained by a ring-opening polymerization of ethyleneoxide, propyleneoxide and tetrahydrofuran; polyester glycol obtained by a ring-opening polymerization of ε-caprolactone, diol obtained by hydroxylation of terminal groups of polybutadiene; copolymers of two kinds of alkyleneoxides; copolymers of two kinds of glycols and a dicarboxylic acid; polyester polyols obtained by a co-condensation polymerization of dicarboxylic acid with a polyol such as aromatic glycol, long chain diol, glycerin, trimethylol propane; and polyetherpolyols obtained by a ring-opening polymerization epoxide and ether compound such as ethyleneoxide, propyleneoxide and tetrahydrofuran with an initiator of a polyol such as glycerin, trimethylolpropane.

The polyurethane prepolymers having terminal isocyanate group are produced by reacting said polyol with excess of said polyisocyanate and can be prepolymers having terminal isocyanate groups based on a polyether or a polyester glycol. The prepolymer can be commercial prepolymer obtained by reacting polytetramethylene glycol with excess of tolylenediisocyanate (Adiprene manufactured by E. I DuPont).

The hardeners used in the present invention are added at a ratio of about 0.8 to 1.2 preferably 0.9 to 1.1 equivalent of a total of amino groups of the hardener and hydroxy groups of the polyols depending upon the polyols, polyisocyanate and prepolymer having terminal isocyanate groups, per 1 equivalent of isocyanate groups.

The ratio of hydroxy groups of the polyol to amino groups of the hardener can be varied in wide range and it is preferably 0.5 to 1.5 equivalent of hydroxy groups of the polyol per 1 equivalent of the amino groups.

The hardeners used in the present invention are solid having low melting point or they are liquid. Accordingly, the processability can be remarkably improved by using the hardener of the compound (I) in comparison with the use of the conventional hardeners.

Moreover, polyurethane elastomers having the balanced pot life and set time and excellent mechanical properties can be obtained by incorporating the hardener of the compound (I) of the present invention.

As shown in Tables 1 to 3, the hardeners of the present invention had lower melting point and superior balanced characteristics in comparison with the other hardeners including the best known hardener of 3,3'-dichloro-4,4'-diaminodiphenylmethane.

The present invention will be further illustrated by certain examples.

EXAMPLE 1: Synthesis of Compound (I).

In a 1 liter four necked flask equipped with a thermometer, a condenser, a dropping funnel and a stirrer, 54.1 g (0.2 mole) of 4-chloro-3,5-dinitro-α,α,α-trifluoromethylbenzene and 250 ml of methanol were charged and a solution of 109 g (0.202 mole) of sodium methoxide in 200 ml of methanol was added dropwise to the mixture under refluxing with stirring during 1 hour and the reaction was continued under refluxing for 1 hour.

Then, methanol was distilled off from the resulting reaction mixture under a reduced pressure and the residue was charged into 500 ml of water and the precipitated crystals were filtered and washed with water and dried and recrystallized from ethanol to obtain 48.4 g of yellow needle-like crystals of 4-methoxy-3,5-dinitro-α,α,α-trifluoromethylbenzene having a melting point of 56° to 58° C. (yield 91% based on 4-chloro-3,5-dinitro-α,α,α-trifluoromethylbenzene).

In the same four necked flask, 113.4 g (2.03 mole) of iron, 3 ml of acetic acid, 200 ml of water and 300 ml of toluene were charged and then, a solution of 45.0 g (0.169 mole) of 4-methoxy-3,5-dinitro-α,α,α-trifluoromethylbenzene in 100 ml of toluene was added dropwise to the mixture under refluxing with stirring during about 50 minutes and the reaction was further continued for 3 hours under refluxing. The resulting reaction mixture was admixed with sodium bicarbonate and then acetic acid was neutralized with it. The iron sludge was separated by filtering it in hot condition and water phase was separated by a phase separation, and toluene was distilled off from the organic phase to obtain crystals. The crystals were recrystallized from ethanol to obtain 31.3 g of white prismic crystals of 4-methoxy-3,5-diamino-α,α,α-trifluoromethylbenzene having a melting point of 41.0° to 42.0° C. (yield 89.8% based on 4-alkoxy-3,5-dinitro-60, αα-trifluoromethylbenzene).

The product was identified by an elemental analysis, NMR spectrum and IR spectrum. The result of the elemental analysis is as follows.

|  | C | H | N | O + F |
| --- | --- | --- | --- | --- |
| Calculated (%) | 46.6 | 4.4 | 13.6 | 35.4 |
| Found (%) | 46.3 | 4.5 | 13.7 | 35.5 |

EXAMPLES 2 to 9: Syntheses of Coumpounds (2) to (9).

The process of Example 1 was repeated to perform the dehalogenation and alkoxylation except using various 4-halogeno-3,5-dinitro-α,α,α-trifluorobenzene (II) instead of 4-chloro-3,5-dinitro-α,α,α-trifluoromethylbenzene and using various alcohols (IV) instead of methanol and using various alkali metal alkoxides (V) instead of sodium methoxide, and then, to perform a reduction except using the resulting 4-alkoxy-3,5-dinitro-α,α,α-trifluoromethylbenzene (III) instead of 4-methoxy-3,5-dinitro-α,α,α-trifluoromethylbenzene whereby various 4-alkoxy-3,5-diamino-α,α,α-trifluoromethylbenzene (I) were obtained.

The results are shown in Table 1.

Table 1

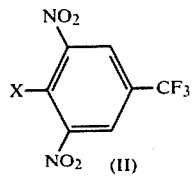

| Example | Starting material (II) | ROM (V) | ROH (IV) | Starting material for reduction (III) |
|---------|------------------------|---------|----------|----------------------------------------|
| 2 | 2-Br-1,3-(NO$_2$)$_2$-5-CF$_3$-benzene | C$_2$H$_5$OK | C$_2$H$_5$OH | 2-C$_2$H$_5$O-1,3-(NO$_2$)$_2$-5-CF$_3$-benzene |
| 3 | " | n-C$_3$H$_7$OK | n-C$_3$H$_7$OH | 2-n-C$_3$H$_7$O-1,3-(NO$_2$)$_2$-5-CF$_3$-benzene |
| 4 | 2-Cl-1,3-(NO$_2$)$_2$-5-CF$_3$-benzene | i-C$_3$H$_7$ONa | i-C$_3$H$_7$OH | 2-i-C$_3$H$_7$O-1,3-(NO$_2$)$_2$-5-CF$_3$-benzene |
| 5 | 2-Cl-1,3-(NO$_2$)$_2$-5-CF$_3$-benzene | n-C$_4$H$_9$ONa | n-C$_4$H$_9$OH | 2-n-C$_4$H$_9$O-1,3-(NO$_2$)$_2$-5-CF$_3$-benzene |
| 6 | " | i-C$_4$H$_9$ONa | i-C$_4$H$_9$OH | 2-i-C$_4$H$_9$O-1,3-(NO$_2$)$_2$-5-CF$_3$-benzene |
| 7 | " | t-C$_4$H$_9$ONa | t-C$_4$H$_9$OH | 2-t-C$_4$H$_9$O-1,3-(NO$_2$)$_2$-5-CF$_3$-benzene |
| 8 | " | n-C$_5$H$_{11}$ONa | n-C$_5$H$_{11}$OH | 2-n-C$_5$H$_{11}$O-1,3-(NO$_2$)$_2$-5-CF$_3$-benzene |

Table 1-continued

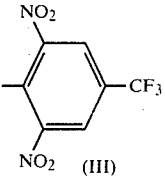

| Example | Starting material (II) | Raw materials for dehalogenation and alkoxylation ROM (V) | ROH (IV) | Starting material for reduction (III) |
|---|---|---|---|---|
| 9 | " | n-C$_6$H$_{13}$ONa | n-C$_6$H$_{13}$OH | n-C$_6$H$_{13}$O— (2,4-dinitro-5-trifluoromethylphenyl ether) |

| | | Reaction Product | | | | | |
|---|---|---|---|---|---|---|---|
| | | Yield[1] | | Elemental analysis (%)[2] | | | |
| Example | Product (I) | (%) | Form Product | C (%) | H (%) | N (%) | O + F (%) |
| 2 | 2-ethoxy-4-trifluoromethyl-1,3-phenylenediamine (C$_2$H$_5$O) | 87.0 (80.9) | Yellow prismic m.p. 53.0° to 54.0° C. | 48.9 (49.1) | 5.2 (5.0) | 12.9 (12.7) | 33.0 (33.2) |
| 3 | 2-n-propoxy-4-trifluoromethyl-1,3-phenylenediamine (n-C$_3$H$_7$O) | 93.0 (85.6) | Brown liquid | 51.0 (51.3) | 5.5 (5.6) | 12.1 (12.0) | 31.4 (31.1) |
| 4 | 2-isopropoxy-4-trifluoromethyl-1,3-phenylenediamine (i-C$_3$H$_7$O) | 85.2 (80.1) | Yellow powder m.p. 85.0° to 87.0° C. | 51.3 (51.3) | 5.7 (5.6) | 12.0 (12.0) | 31.0 (31.1) |
| 5 | 2-n-butoxy-4-trifluoromethyl-1,3-phenylenediamine (n-C$_4$H$_9$O) | 86.5 (79.6) | Brown liquid b.p. 134°–136° C./2mmHg | 53.3 (53.2) | 5.9 (6.1) | 11.1 (11.3) | 29.7 (29.4) |
| 6 | 2-isobutoxy-4-trifluoromethyl-1,3-phenylenediamine (i-C$_4$H$_9$O) | 88.4 (81.3) | Pale Brown prismic m.p. 57.0° to 59.0° C. | 53.0 (53.2) | 6.3 (6.1) | 11.3 (11.3) | 29.4 (29.4) |

-continued

| | | Reaction Product | | | | | |
|---|---|---|---|---|---|---|---|
| | | Yield[1] | | Form Product | [2]Elemental analysis (%) | | |
| Example | Product (I) | (%) | | | C (%) | H (%) | N (%) | O + F (%) |
| 7 | NH₂<br>t-C₄H₉O—⟨⟩—CF₃<br>NH₂ | 85.1<br>(78.3) | Pale Brown prismic<br>m.p. 48.0° to 49.0° C. | 53.4<br>(53.2) | 6.1<br>(6.1) | 11.4<br>(11.3) | 29.1<br>(29.4) |
| 8 | NH₂<br>n-C₅H₁₁O—⟨⟩—CF₃<br>NH₂ | 83.7<br>(77.6) | Brown liquid | 54.8<br>(55.0) | 6.5<br>(6.5) | 10.6<br>(10.7) | 28.1<br>(27.8) |
| 9 | NH₂<br>n-C₆H₁₃—⟨⟩—CF₃<br>NH₂ | 84.0<br>(76.4) | Brown liquid | 56.1<br>(56.5) | 6.8<br>(6.9) | 10.1<br>(10.1) | 27.0<br>(26.5) | note:
[1] ( ): yield based on 4-halogeno-3,5-dinitro-α,α,α-trifluoromethylbenzene
[2] ( ): calculated (%)

EXAMPLE 10

After melting 9.8 g of 4-methoxy-3,5-diamino-α,α,α-trifluoromethylbenzene of Example 1, it was added to 100 g of a prepolymer having 4.19% of NCO content obtained by reacting a polyol component of polytetramethyleneglycol (OH value: 114) with isocyanate components of 95% of 2,4-tolylene diisocyanate and 5% of 2,6-tolylene diisocyanate at 80° C. The ratio of —NCO: —NH₂ in the reaction was 1:0.95.

The reaction mixture was stirred for about 60 seconds to be homogeneous and it was poured into a mold (100 mm × 250 mm × 2 mm) heated to 100° C. After setting the product, it was taken out of the mold and it was heated at 100° C. for 15 hours as an after curing and various properties of the product were measured. The results are shown in Table 2.

EXAMPLES 11 to 18

In accordance with the process of Example 10, except using various hardeners obtained in Examples 2 to 9, the polyurethane elastomers were produced and the properties were measured. The results are shown in Table 2.

REFERENCE 1

In accordance with the process of Example 10 except using 9.6 g of 4-chloro-3,5-diamino-α,α,α-trifluoromethylbenzene as a hardener, a polyurethane elastomer was produced and properties were measured. The results are shown in Table 2.

REFERENCE 2

In accordance with the process of Example 10 except using 12.7 g of 3,3'-dichloro-4,4'-diaminodiphenylmethane as a hardener, a polyurethane elastomer was produced and properties were measured. The results are shown in Table 2.

Table 2

| | Example | | | | | | | | | Reference | |
|---|---|---|---|---|---|---|---|---|---|---|---|
| | 10 | 11 | 12 | 13 | 14 | 15 | 16 | 17 | 18 | 1 | 2 |
| Pot life (min.) | 15 | 15 | 17 | 18 | 14 | 14 | 16 | 17 | 19 | 100 | 15 |
| Set time (min.) | 30 | 30 | 30 | 40 | 30 | 30 | 30 | 40 | 60 | 500< | 30 |
| Physical properties | | | | | | | | | | | |
| Hardness (Shore A) | 93 | 93 | 93 | 91 | 90 | 95 | 92 | 90 | 90 | 85 | 91 |
| Tensile strength (Kg/cm²) | 418 | 485 | 365 | 313 | 291 | 360 | 285 | 276 | 305 | 210 | 373 |
| Tear strength (Kg/cm) | 95 | 97 | 94 | 89 | 85 | 95 | 90 | 85 | 83 | 68 | 92 |
| Rebound elasticity (%) | 60 | 58 | 58 | 55 | 56 | 59 | 56 | 55 | 54 | 50 | 54 |
| Modulus 100% (Kg/cm²) | 85 | 82 | 80 | 75 | 69 | 93 | 77 | 66 | 70 | 52 | 83 |
| Modulus 300% (Kg/cm²) | 115 | 116 | 111 | 101 | 98 | 121 | 103 | 102 | 105 | 89 | 164 |
| Elongation (%) | 450 | 490 | 450 | 510 | 500 | 450 | 460 | 440 | 460 | 570 | 440 |
| Permanent strain (%) | 29 | 35 | 33 | 36 | 36 | 32 | 30 | 37 | 39 | 44 | 28 |

EXAMPLE 19

As a hardener, 7.0 g of 4-methoxy-3,5-diamino-α,α,α-trifluoromethylbenzene of Example 1 was added to 100 g of a prepolymer having 3.0% of NCO content obtained by reacting polyol component of polyethylene adipate (OH value: 56.5%) with isocyanate components of 80% of 2,4-tolylenediisocyanate and 20% of 2,6-tolylenediisocyanate at 80° C. The ratio of —NCO:—NH$_2$ in the reaction was 1:0.95.

In accordance with the process of Example 10, a polyurethane elastomer was produced from the reaction mixture and various properties of the product were measured. The results are shown in Table 3.

EXAMPLES 20 to 27

In accordance with the process of Example 19, except using various hardeners obtained in Examples 2 to 9, the polyurethane elastomers were produced and the properties were measured. The results are shown in Table 3.

REFERENCE 3

In accordance with the process of Example 19, except using 6.9 g of 4-chloro-3,5-diamino-α,α,α-trifluoromethylbenzene as a hardener, a polyurethane elastomer was produced and properties were measured. The results are shown in Table 3.

REFERENCE 4

In accordance with the process of Example 19 except using 9.1 g of 3,3'-dichloro-4,4'-diamino-diphenylmethane as a hardener, a polyurethane elastomer was produced and the properties were measured. The results are shown in Table 3.

Table 3

|  | Example |  |  |  |  |  |  |  |  | Reference |  |
|---|---|---|---|---|---|---|---|---|---|---|---|
|  | 19 | 20 | 21 | 22 | 23 | 24 | 25 | 26 | 27 | 3 | 4 |
| Pot life (min.) | 10 | 10 | 11 | 13 | 9 | 9 | 10 | 14 | 14 | 60 | 10 |
| Set time (min.) | 60 | 60 | 60 | 90 | 60 | 60 | 60 | 90 | 90 | 500 | 60 |
| Physical properties |  |  |  |  |  |  |  |  |  |  |  |
| Hardness (Shore A) | 84 | 83 | 83 | 81 | 80 | 84 | 83 | 80 | 79 | 74 | 81 |
| Tensile strength (Kg/cm$^2$) | 510 | 496 | 525 | 445 | 430 | 540 | 533 | 410 | 436 | 392 | 450 |
| Tear strength (Kg/cm) | 81 | 83 | 85 | 77 | 73 | 89 | 88 | 73 | 71 | 63 | 76 |
| Rebound elasticity (%) | 48 | 49 | 47 | 46 | 45 | 49 | 48 | 46 | 45 | 42 | 45 |
| Modulus 100% (Kg/cm$^2$) | 51 | 49 | 48 | 41 | 39 | 52 | 50 | 42 | 38 | 35 | 40 |
| Modulus 300% (Kg/cm$^2$) | 72 | 68 | 65 | 61 | 60 | 74 | 70 | 59 | 56 | 54 | 80 |
| Elongation (%) | 700 | 700 | 720 | 710 | 690 | 680 | 690 | 710 | 730 | 790 | 680 |
| Permanent strain (%) | 33 | 34 | 36 | 37 | 39 | 32 | 35 | 39 | 40 | 45 | 30 |

As shown in Tables 1 to 3, the hardeners of the present invention had lower melting point and superior balanced characteristics in comparison with the other hardeners including the best known hardener of 3,3'-dichloro-4,4'-diaminodiphenylmethane.

What is claimed is:

1. 4-Alkoxy-3,5-diamino-α,α,α-trifluoromethylbenzene having the formula

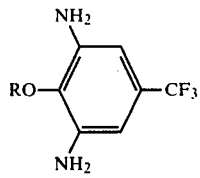

wherein R represents a C$_1$–C$_8$ alkyl group.

2. 4-Alkoxy-3,5-diamino-α,α,α-trifluoromethylbenzene according to claim 1, wherein said alkyl group is selected from the group consisting of methyl, ethyl, n-propyl, i-propyl, n-butyl, i-butyl, t-butyl, n-pentyl, and n-hexyl.

* * * * *